W. E. POUNDS.
NUT LOCK.
APPLICATION FILED APR. 3, 1908.
910,954.
Patented Jan. 26, 1909.
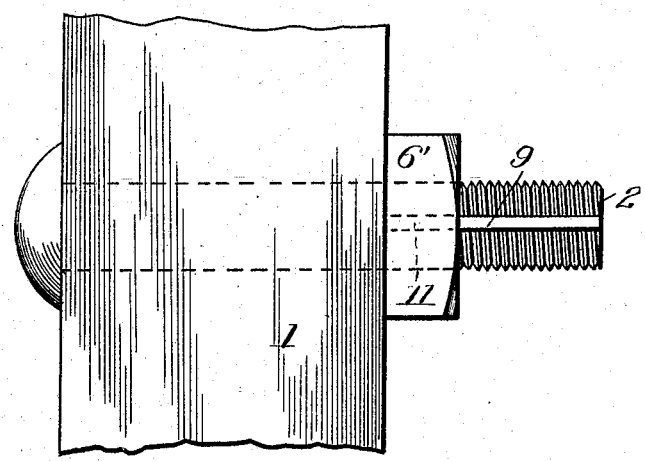
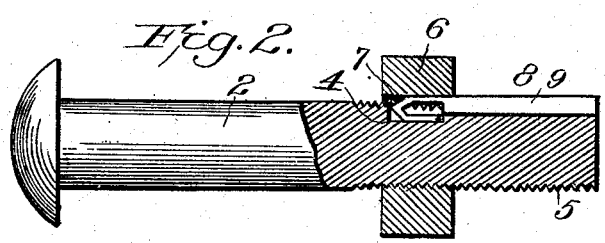
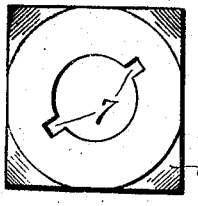
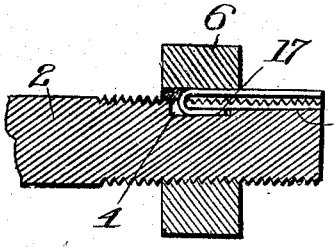
Witnesses
C. H. Walker.
Irv. L. McCathran.
Inventor,
Will E. Pounds.
By E. E. Vrooman
his Attorney,

UNITED STATES PATENT OFFICE.

WILL E. POUNDS, OF OAKMAN, ALABAMA, ASSIGNOR OF ONE-HALF TO OSCAR DAY, OF OAKMAN, ALABAMA.

NUT-LOCK.

No. 910,954.        Specification of Letters Patent.        Patented Jan. 26, 1909.

Application filed April 3, 1908. Serial No. 424,944.

*To all whom it may concern:*

Be it known that I, WILL E. POUNDS, a citizen of the United States, residing at Oakman, in the county of Walker and State of Alabama, have invented certain new and useful Improvements in Nut-Locks, of which the following is a specification, reference being had therein to the accompanying drawing.

This invention relates to means for fastening a nut upon a bolt, whereby the nut can not be accidentally displaced or will not have independent, rotary movement upon said bolt, after it has been fastened thereon.

The object of the invention is the construction of simple and comparatively inexpensive fastening means for fastening a nut and bolt together against independent rotary movement.

Another object of the invention is the peculiar construction of a spring-key, which, when assembled with the bolt and nut will positively secure the nut from accidental displacement off of the bolt.

With these and other objects in view, the invention consists of certain novel constructions, combinations, and arrangements of parts, as will be hereinafter fully described and claimed.

In the drawings: Figure 1 is a top plan view of a device constructed in accordance with the present invention. Fig. 2 is a view, in side elevation, partly in longitudinal section, of a device constructed in accordance with the present invention. Fig. 3 is an enlarged, perspective view of the spring-key. Fig. 4 is an end-view in elevation, of a nut employed in the present invention. Fig. 5 is a fragmentary, sectional view, showing another embodiment of the spring locking-key. Fig. 6 is an enlarged, perspective view of the key depicted in Fig. 5.

Referring to the drawings by numerals, 1 designates a support, through which extends the bolt 2, which is provided with a longitudinally-extending groove 3, which groove terminates at its inner end in an elongated socket or recess 4, that is formed in a horizontal plane below the groove 3, or, in other words, the socket or pocket 4 is deeper than the groove 3. The bolt 2 is screw-threaded, at 5, and upon the screw-threaded portion, is mounted an internally threaded nut 6. The nut 6 is provided with, preferably, diametrically-arranged, cut-out portions 7, Fig. 4, one of which is adapted to register with the groove 3. The structure of the bolt and the nut is the same in both Figs. 2 and 5, the only difference being in the spring locking-key. The spring locking-key 8, Figs. 2 and 3 comprises a body portion 9, formed of metal and having a vertical, inner wall 10 terminating at its upper end in a spring-extension 11, which extension 11 terminates, at its outer end, in a downwardly-extending portion 12, and said portion 12 terminates, at its outer end, in a downwardly and inwardly-extending portion 13; the portions 12 and 13 forming a substantially V-shaped, spring-structure carrying an inwardly extending, horizontal extension 14, integral with the lower end of portion 13. The portions 11 to 14 are formed of resilient material, so that portions 13 and 14 can be forced together towards portions 11 and 12 for permitting the passage of said portions 11 to 14 into the registering cut-out portion or notch 7 of the nut and the grooves 3 of the bolt for allowing the portions 13 and 14 to spring or "snap" into the socket or pocket 4 of the bolt, Fig. 2; the body portion 9 of the spring-key lying snug in the groove 3.

It is to be noted that by reason of the resiliency of the expansible portion of the locking-key, the same can be forced through the mouth of the opening constituted by one of the cut-out portions 7 and groove 3, and as soon as said expansible portion enters the socket or pocket, the same will expand, thereby causing the lower portion 14 to bear parallel against the bottom of the socket 4 and the upper flat portion 11 to bear against the upper face of the cut-out portion 7 of the nut, Fig. 2, forming an efficient and rigid lock for preventing nut 6 from having independent rotary movement, or being accidentally displaced therefrom.

In Figs. 5 and 6, the same structure of the bolt 2 and the nut 6 is employed, except that the spring-locking key 8ᵃ is formed of a resilient strip of metal, and comprises a body portion 15 terminating at one end in an expansible, substantially U-shaped portion 16, which portion 16 is provided with a lower portion 17 adapted to be normally seated in the socket or pocket 4, the same as portion 14 of key 8; the expansible body of the spring key 8ᵃ can be forced into the cut-out portion 7 of the nut, and be sprung into the socket 4, as readily as the key 8, but the key 8 is more efficient, as its entire body lies flat within the groove 3, and thereby prevents any lateral movement of the body upon the bolt, and also enables the nut to engage a portion of the body, which removes some of the strain from the expansible portion, should a person endeavor to remove the nut, after the expansible portion of the key has been seated in pocket 4.

It is to be understood that I have provided a key having a substantially U-shaped end, which end is expansible and is adapted to be positioned in a portion of the bolt and a portion of the nut for locking said nut and bolt against independent rotary movement; the body portion of the key having an integral part thereof bent parallel thereon, and the integral part being expansible for the purpose hereinbefore specified.

What I claim is:

1. In a nut lock, the combination with a bolt and a nut threaded thereon, said bolt provided with a groove and a pocket, the pocket deeper than the groove and formed in a horizontal plane below the bottom of the groove, said nut provided with a notch registering with said groove and pocket, of a locking key having a body resting in the groove of the bolt, said key provided with an expansible locking portion integral with the body portion, said locking portion comprising a straight, upper or outer portion terminating at its outer end in a downwardly and outwardly-extending portion, said outwardly-extending portion terminating at its outer end in a downwardly and inwardly-extending portion, and said inwardly-extending portion terminating in a lower or inner, horizontal straight portion parallel with the upper or outer portion and said last-mentioned straight portion seated in the pocket.

2. In a nut lock, the combination of a bolt provided with a longitudinally-extending groove terminating at its inner end in an elongated recess deeper than the groove, a nut threaded upon the grooved portion of said bolt, said nut provided with a notch adapted to register with the groove of said bolt, a locking key having a body resting in the groove and notch, said key provided with an expansible locking portion, said locking portion provided with a lower portion positioned substantially parallel with the body portion of the key, the lower portion positioned in the elongated recess and having its inner end normally bearing against one end of said recess for preventing the key from being displaced off of said bolt.

3. In a nut lock, the combination of a bolt provided with a longitudinally-extending groove terminating at its inner end in a longitudinally-extending recess, the recess being formed below the bottom of the groove, a nut threaded upon the grooved portion of said bolt, and a locking key positioned in the groove and in the nut, said key provided with a substantially U-shaped portion at its inner end, the lower end of the U-shaped portion positioned entirely within the recess and having one end engaging the end of the recess for preventing the key from being displaced off of the bolt.

In testimony whereof I hereunto affix my signature in presence of two witnesses.

WILL E. POUNDS.

Witnesses:
JOHN A. NORRIS,
MURRAY CONNOR.